(12) United States Patent
Bruno

(10) Patent No.: US 9,878,794 B2
(45) Date of Patent: Jan. 30, 2018

(54) ENVIRONMENTAL CONTROL SYSTEM UTILIZING SHOESTRING CYCLE TO MAXIMIZE EFFICIENCY

(71) Applicant: Hamilton Sundstrand Corporation, Windsor Locks, CT (US)

(72) Inventor: Louis J. Bruno, Ellington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 122 days.

(21) Appl. No.: 14/695,611

(22) Filed: Apr. 24, 2015

(65) Prior Publication Data

US 2015/0307196 A1    Oct. 29, 2015

Related U.S. Application Data

(60) Provisional application No. 61/983,644, filed on Apr. 24, 2014.

(51) Int. Cl.
*B64D 13/06* (2006.01)
*F02C 6/08* (2006.01)

(52) U.S. Cl.
CPC ............... *B64D 13/06* (2013.01); *F02C 6/08* (2013.01); *B64D 2013/0618* (2013.01); *B64D 2013/0648* (2013.01); *B64D 2013/0688* (2013.01); *Y02T 50/56* (2013.01)

(58) Field of Classification Search
CPC ... F02C 6/08; B64D 13/06; B64D 2013/0648; B64D 2013/0688; B64D 2013/0618; B64D 13/02; B64D 2013/0622; B64D 2013/0666; B64D 2013/0611; B64D 2013/0644; B64D 2013/0651; B64D 2013/0677; B64D 2013/0607; B64D 2041/002; Y02T 50/56; Y02T 50/44; Y02T 50/545; Y02T 29/4962; Y02T 29/49826; Y02T 29/4935; G05B 23/0235; G05B 23/02
USPC ...................................................... 62/61, 87
See application file for complete search history.

(56) References Cited

U.S. PATENT DOCUMENTS

| | | | | |
|---|---|---|---|---|
| 4,312,191 A * | 1/1982 | Biagini | ................. | B64D 13/06 62/172 |
| 5,461,882 A * | 10/1995 | Zywiak | ............. | B60H 1/00007 62/401 |
| 5,511,385 A * | 4/1996 | Drew | .................... | B64D 13/06 62/172 |
| 7,607,318 B2 * | 10/2009 | Lui | ....................... | B64D 13/06 244/118.5 |
| 2007/0266695 A1 | 11/2007 | Lui et al. | | |
| 2008/0022688 A1 | 1/2008 | Decrisantis et al. | | |
| 2008/0264084 A1 * | 10/2008 | Derouineau | .......... | B64D 13/06 62/172 |
| 2012/0285184 A1 | 11/2012 | Voinov | | |

* cited by examiner

*Primary Examiner* — Mohammad M Ali
(74) *Attorney, Agent, or Firm* — Cantor Colburn LLP

(57) ABSTRACT

A method for providing recirculation air to an environmental control system is provided. The method includes supplying via an inlet a flow of bleed air to the environmental control system at a first energy, providing the bleed air from the environmental control system at a second energy into a chamber, and providing the recirculation air to the environmental control system by recirculating the bleed air at a third energy from the chamber to an air cycle machine.

11 Claims, 8 Drawing Sheets

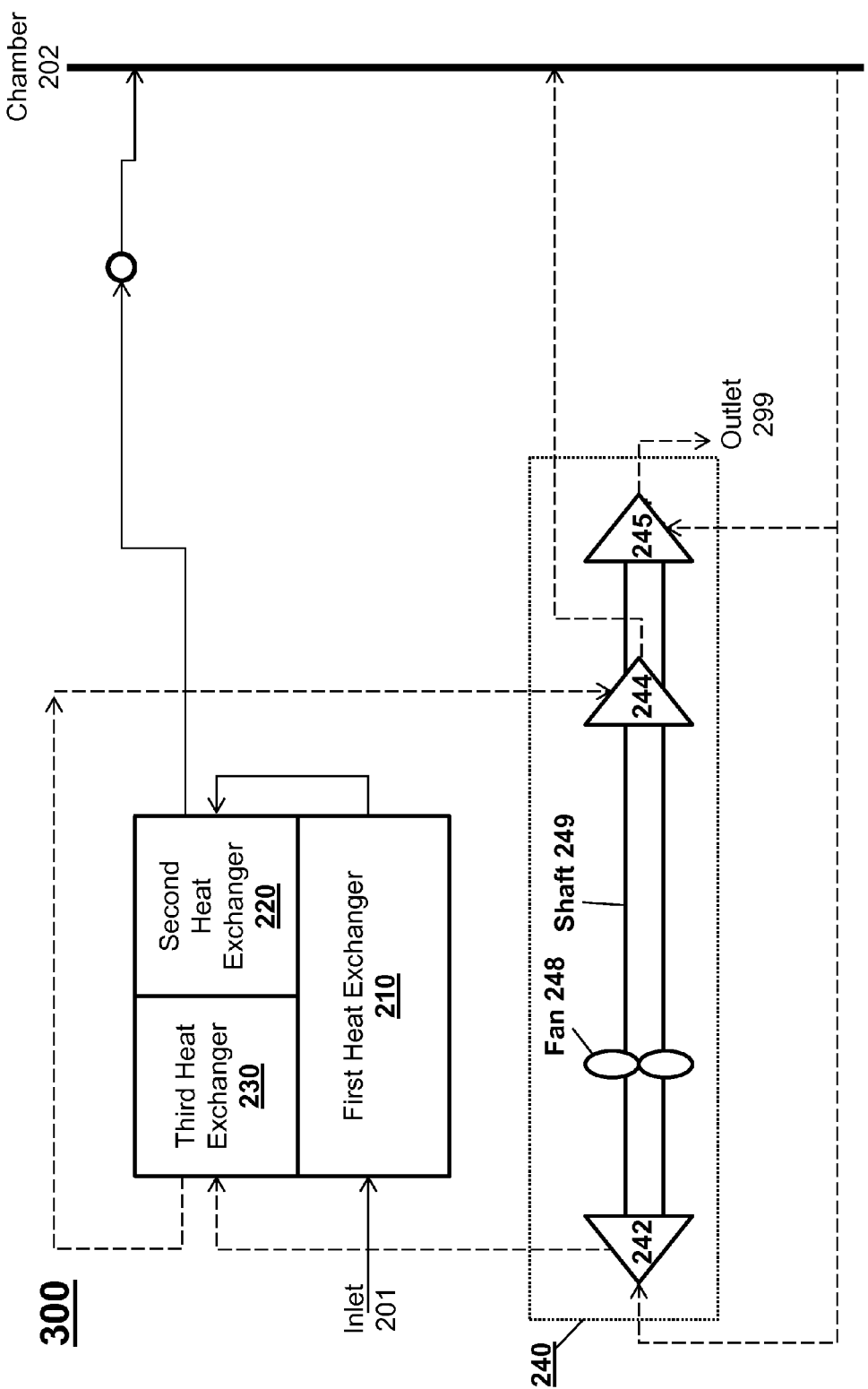

US 9,878,794 B2

ENVIRONMENTAL CONTROL SYSTEM UTILIZING SHOESTRING CYCLE TO MAXIMIZE EFFICIENCY

BACKGROUND OF THE INVENTION

In general, there is an overarching trend in the aerospace industry towards more efficient systems within an aircraft. With respect to present air conditioning systems of the aircraft, efficiency can be derived from utilizing proper engine bleed pressures based on environmental condition surroundings the aircraft.

For example, pressurized air from an engine of the aircraft is provided to a cabin through a series of systems that alters the temperature, humidity, and pressure of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION OF THE INVENTION

According to one embodiment, a method for providing recirculation air to an environmental control system comprises supplying via an inlet a flow of bleed air to the environmental control system at a first energy; providing the bleed air from the environmental control system at a second energy into a chamber; and providing the recirculation air to the environmental control system by recirculating the bleed air at a third energy from the chamber to an air cycle machine.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3B depicts a schematic of a system during a flight operation by an aircraft according to an embodiment;

DETAILED DESCRIPTION OF THE INVENTION

A detailed description of one or more embodiments of the disclosed apparatus and method are presented herein by way of exemplification and not limitation with reference to the Figures.

As indicated above, the relatively high pressures provide limited efficiency with respect to engine fuel burn. Thus, what is needed is an environmental control system, which utilizes an integrated approach with respect to a recirculation cooling and a bleed cooling via a shoestring cycle, to provide cabin pressurization and cooling at high engine fuel burn efficiency. The shoestring cycle operates in at least two different modes. A first mode is a high pressure bleed mode, which can be used on the ground and during airplane climb. In the high pressure bleed mode, the bleed air is the source of energy to drive the shoestring cycle. A second mode is a low pressure mode, which can be used during cruise. In the low pressure mode, the pressurized cabin air is the source of energy to drive the shoestring cycle.

In general, embodiments of the present invention disclosed herein may include a system and/or method (herein system) comprising a plurality of heat exchangers and a medium flowing through the plurality of heat exchangers. The medium can be bled from different pressure locations of a source, such as an engine, based on environmental conditions surrounding the system. A compressing device, in communication with the plurality of heat exchangers, is utilized to regulate a pressure of the medium flowing between the plurality of heat exchangers. The compressing device utilizes the medium itself as a power source to regulate the pressure of the medium. Particularly, the medium is utilized directly from the engine (e.g., bleed air) and after the medium has circulated through a chamber (recirculation air).

Figure 1:
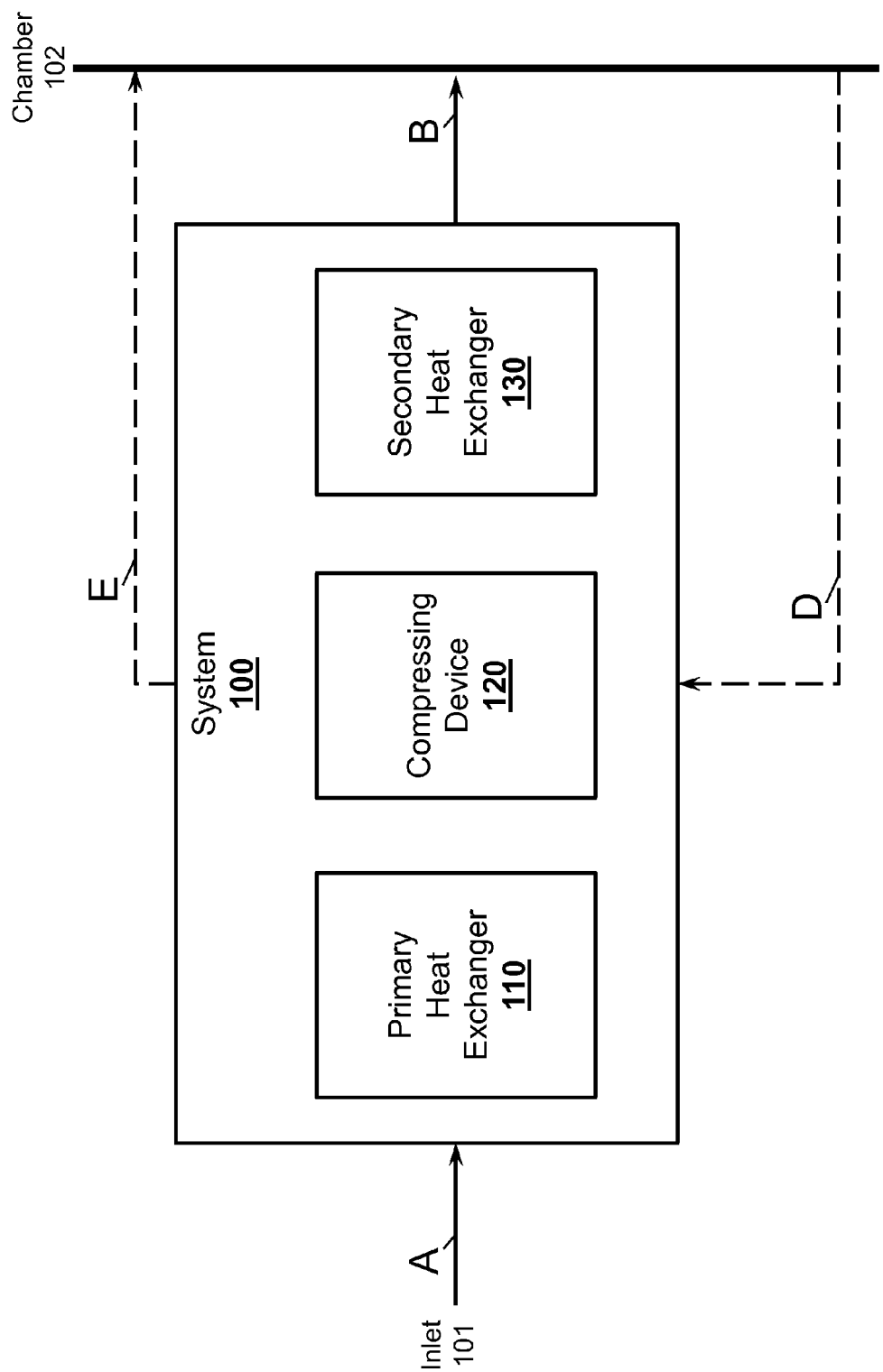
FIG. 1 depicts a schematic of a system according to an embodiment.

FIG. 1 illustrates a medium (e.g., air) flowing from an inlet 101 through a system 100 to a chamber 102, as indicated by solid-lined arrows A, B. In the system 100, the medium can flow from the inlet 101 to a primary heat exchanger 110, from the primary heat exchanger 110 to a compressing device 120, from the compressing device 120 to a secondary heat exchanger 130, and from the secondary heat exchanger 130 to the chamber 102. Further, the medium recirculates from chamber 102 through the system 100 and back to the chamber 102 (and/or external to the system 100), as indicated by the dashed-lined arrows D, E.

In one embodiment, the system 100 can be any environmental control system of a vehicle, such as an aircraft or watercraft, that provides air supply, thermal control, and cabin pressurization for a crew and passengers of the vehicle (e.g., a cabin air conditioning system of an aircraft). The system may also include avionics cooling, smoke detection, and fire suppression. For example, on an aircraft, air is supplied to the environmental control system by being "bled" from a source, such as a compressor stage of a turbine engine. In this way, the temperature and pressure of this "bleed air" varies widely depending upon which compressor stage and a revolutions per minute of the turbine engine. To achieve the desired temperature, the bleed-air is cooled as it is passed through at least one heat exchanger (e.g., exchangers 120, 130). To achieve the desired pressure, the bleed-air is compressed as it is passed through a compressing device (e.g., compressing device 120). The interaction of the environmental control system with the engine influences how much fuel burn by the engine is needed to perform operations, such as supplying pressurized air, related to that interaction.

Heat exchangers (e.g., a primary heat exchanger 110 and a secondary heat exchanger 130) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) is blown across the heat exchanger at a variable cooling airflow to control the final air temperature of the bleed-air.

The compressing device 120 (e.g., an air cycle machine as described below) is a mechanical device that controls/regulates a pressure of a medium (e.g., increasing the pressure of a gas). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

Figure 2:
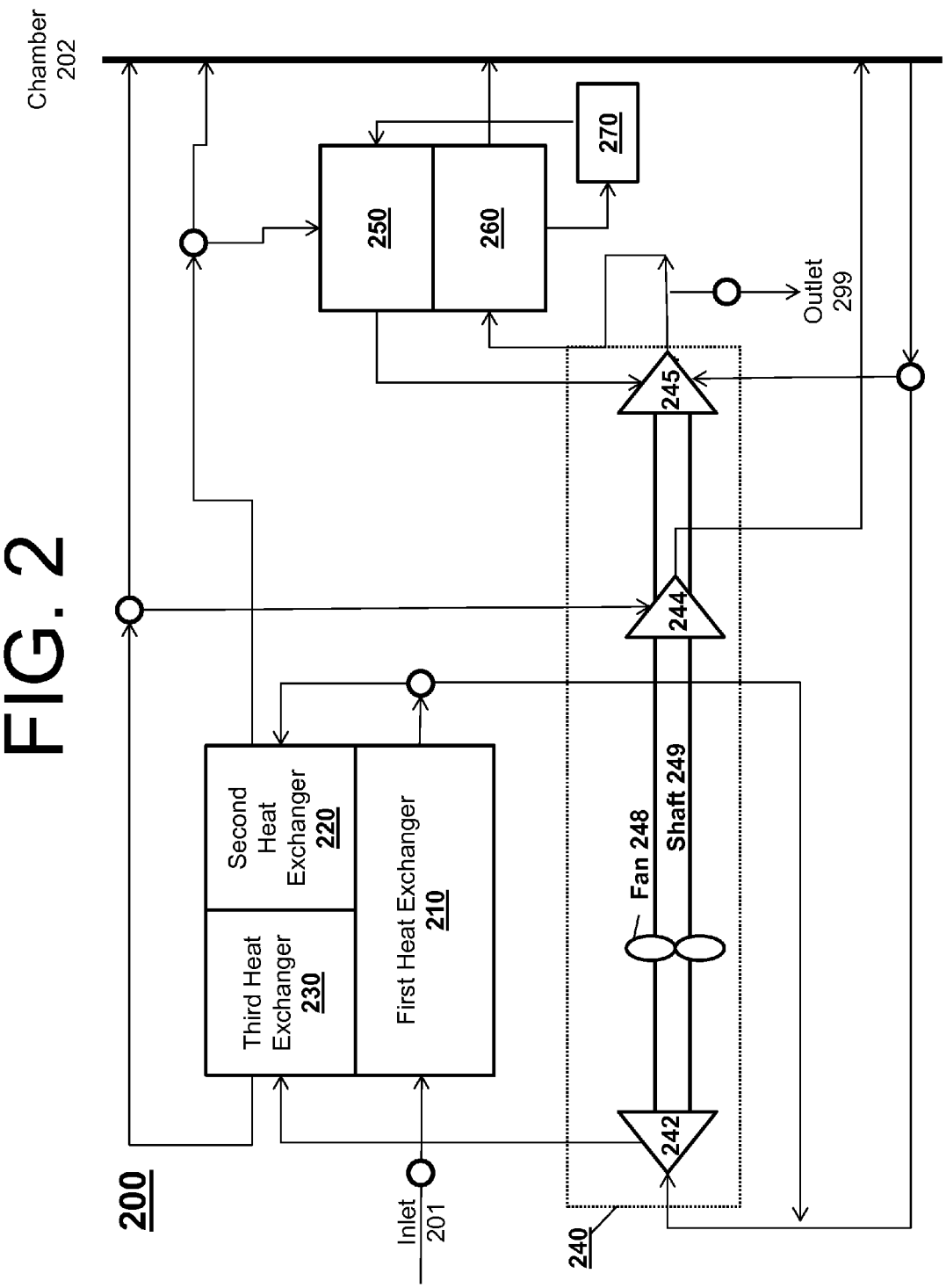
FIG. 2 depicts another schematic of a system according to an embodiment.

With respect to an aircraft example, the system 100 of FIG. 1 will now be described with reference to FIGS. 2-7, in view of the aircraft example above. FIG. 2 depicts a schematic of a system 200 (e.g., an embodiment of system 100) as it could be installed on an aircraft. The system 200 illustrates bleed air flowing in at inlet 201 (e.g., off an engine of an aircraft at an initial flow rate, pressure, temperature, and humidity), which in turn is provided to a chamber 202 (e.g., cabin, flight deck, etc.) at a final flow rate, pressure, temperature, and humidity. Then the bleed air recirculates back through the system 200 from the chamber 202. The system 200 further illustrates heat exchangers 210, 220, 230, an air cycle machine 240 (that includes a compressor 242, turbines 244, 245, a fan 248, and a shaft 249), a reheater 250, a condenser 260, and a water extractor 270, each of which is connected via tubes, pipes, and the like. Note that based on the embodiment, an exhaust from the system 200 can be sent to an outlet 299 (e.g., releases to ambient air).

The system 200 is an example of an environmental control system of an aircraft that provides air supply, thermal control, and cabin pressurization for the crew and passengers of the aircraft. Valves are devices that regulate, direct, and/or control a flow of a medium (e.g., gases, liquids, fluidized solids, or slurries, such as bleed-air) by opening, closing, or partially obstructing various passageways within the tubes, pipes, etc. of the environmental control system 200. Valves can be operated by actuators, such that the flow rates of any medium in any portion of the environmental control system 200 may be regulated to a desired value.

Heat exchangers 210, 220, 230 are examples of a heat exchanger as described above. Note that the second heat exchanger 220 can be a simple cycle heat exchanger, while the third heat exchanger 230 can be a shoestring heat exchanger.

The air cycle machine 240 (that includes a compressor 242, turbines 244, 245, a fan 248, and a shaft 249), controls/regulates a pressure of a medium (e.g., increasing the pressure of a bleed air). The compressor 242 is a mechanical device that raises the pressure of the bleed-air received from the first heat exchanger. The turbines 244, 245 are mechanical devices that drive the compressor 242 and fan 248 via the shaft 249. The fan 248 is a mechanical device that forces via push or pull methods air through the shell across the heat exchangers 210, 220, 230 at a variable cooling airflow. The compressor 242, turbines 244, 245, and fan 248 together illustrate, for example, that the air cycle machine (e.g., the compressing device 120) may operate as a four-wheel air cycle machine that utilizes air recirculated from the chamber 202.

The reheater 250 is a particular type of heat exchanger described above. The condenser 260 is a particular type of heat exchanger as described above. The water extractor 270 is a mechanical device that performs a process of taking water from any source, such as bleed-air, either temporarily or permanently. Together, reheater 250, the condenser 260, and/or the water extractor 270 can combine to be a high pressure water separator.

Figure 3A:
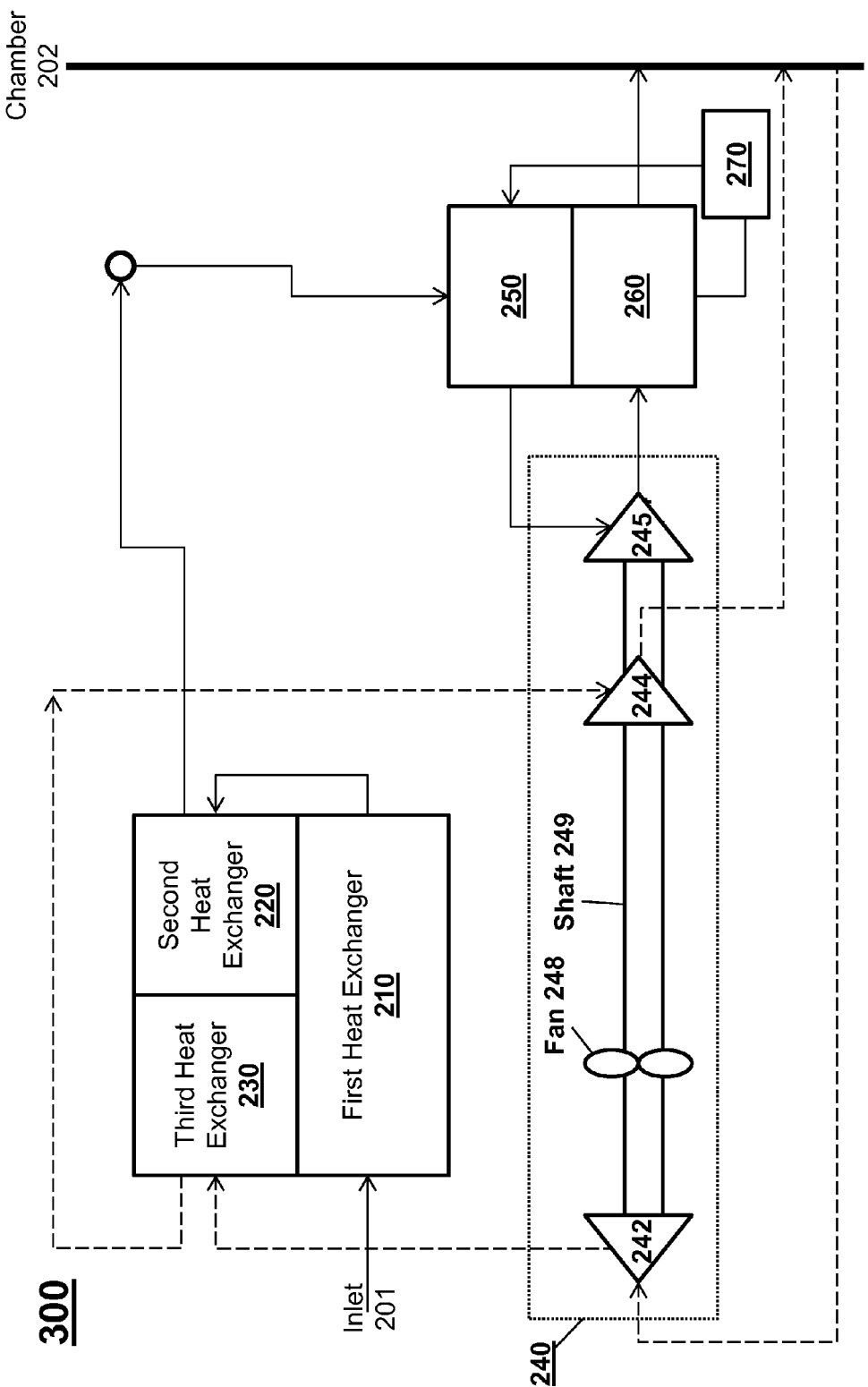
FIG. 3A depicts a schematic of a system during a ground operation by an aircraft according to an embodiment.

FIG. 3A depicts a schematic of a system 300 (e.g., an operational embodiment of the system 200 of FIG. 2) during a ground operation by an aircraft. The bleed air is illustrated as solid arrows flowing through the system 300 from inlet 201 to chamber 202. The recirculation air is illustrated as dashed arrows flowing from the chamber 202 through the system 300 back to the chamber 202. The bleed air in this embodiment is driving the recirculation loop (e.g., to create a shoestring cycle). For example, at the inlet 201, the bleed air is coming off the engine (e.g., at 35 psi air) and goes through the components of the system 300, such as into the first and second heat exchangers 210, 220 and the high pressure water separator (e.g., blocks 250, 260, 270) to get cooled and dehumidified. Further, the bleed air expands across the turbine 245, before being sent to the chamber 202. Next, the energy in the bleed air that is in the chamber 202 is utilized to drive a recirculation of the bleed air (herein recirculation air) directly. That is, as the bleed air is expanding across the turbine 245, the recirculation air from the chamber 202 is drawn in and compress by the compressor 242 before being passed to the third heat exchanger 230, the turbine 244, and back to the chamber 202. In this way, the energy of the bleed air is being utilized to directly drive a recirculation sub-system of the system 300 to cool the recirculation air directly.

FIG. 3B depicts a schematic of a system during a flight operation by an aircraft according to an embodiment. The recirculation air in this embodiment is driving the recirculation loop. That is, the recirculation air from the chamber 202 expands across the turbine 245 to drive the recirculation air directly, before being sent overboard (e.g., outlet 299). In this way, power is ascertained while the aircraft is in flight because the ambient air at the outlet 299 is at a lower pressure than the recirculation air coming from the chamber 202.

Figure 4:
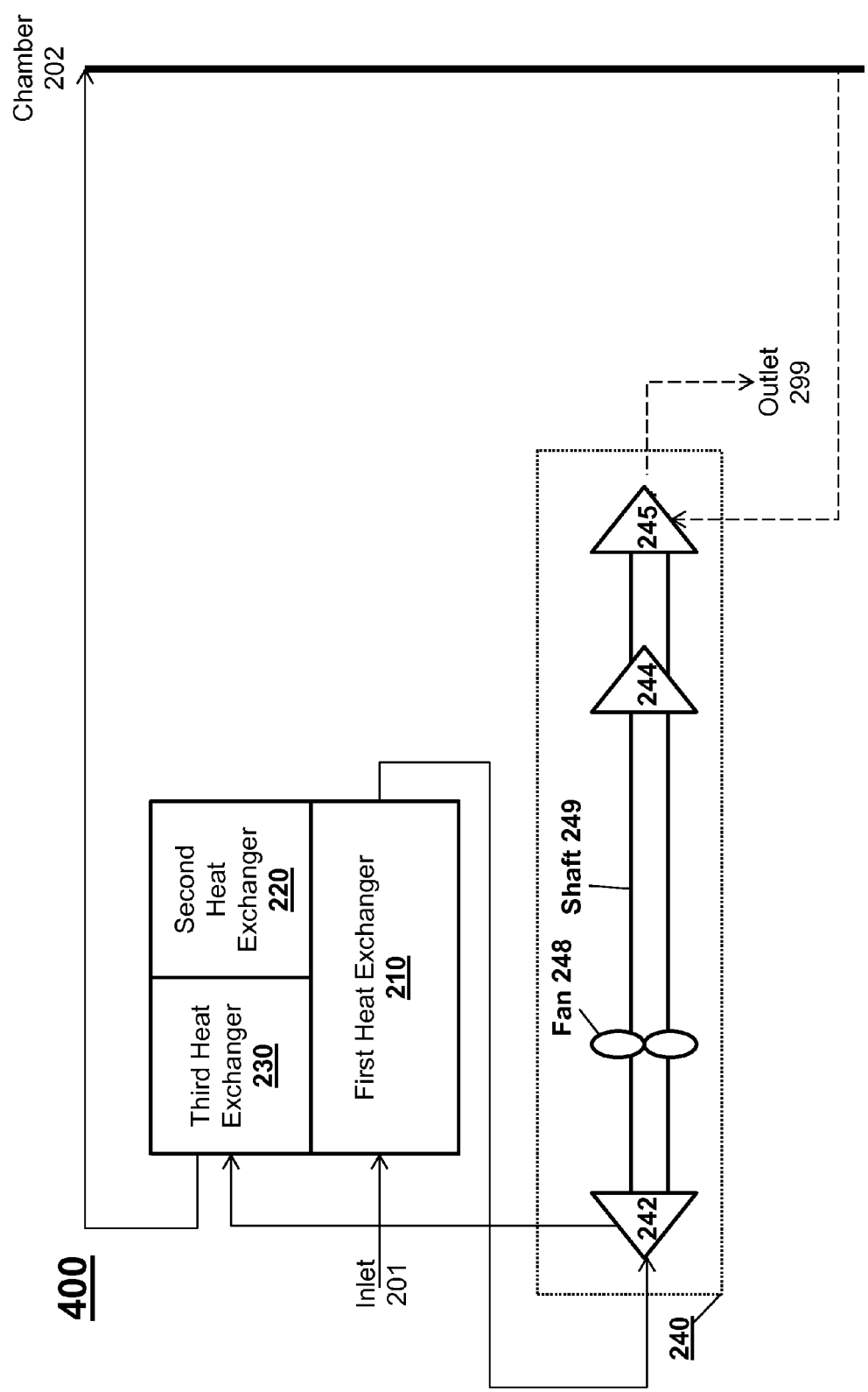
FIG. 4 depicts another schematic of a system during a flight operation by an aircraft according to an embodiment.

FIG. 4 depicts another schematic of a system 400 (e.g., an operational embodiment of the system 200 of FIG. 2) during a flight operation by an aircraft. The bleed air is illustrated as solid arrows flowing through the system 400 from inlet 201 to chamber 202. The recirculation air is illustrated as dashed arrows flowing from the chamber 202 through the system 400. In the system 400, a pressure of the bleed air at the first heat exchanger 210 can be very low, such as at cabin pressure, 12 psi, or 13 psi, because during flight operation the bleed air is drawn from the lowest pressure location of the engine available to operate the system 400 (e.g., at cabin pressure, 12 psi, or 13 psi). To get the bleed air in this embodiment to the chamber 202, the energy of the bleed air in the chamber 202, which is the same or relatively close the pressure of the bleed air entering the first heat exchanger 210 (e.g., cabin pressure, 12 psi, or 13 psi), is utilized to provide power to the turbine 245. That is, the power is ascertained because while an aircraft is in flight, the ambient air at the outlet 299 is at a lower pressure than the bleed air in the chamber 202. For example, if the bleed air in the chamber 202 is at 12 psi and the ambient air at the outlet 299 is at or below 3 psi, then the air pressure ratio between the chamber 202 and the outlet 299, which in this example is 4:1 or greater, creates a flow of air from chamber 202 across the turbine 245. This flow of chamber 202 provides the power to drive the compressor 242, which increase the pressure of the bleed air as it exits the first heat exchanger 210 and before it enters the third heat exchanger 230.

Figure 5:
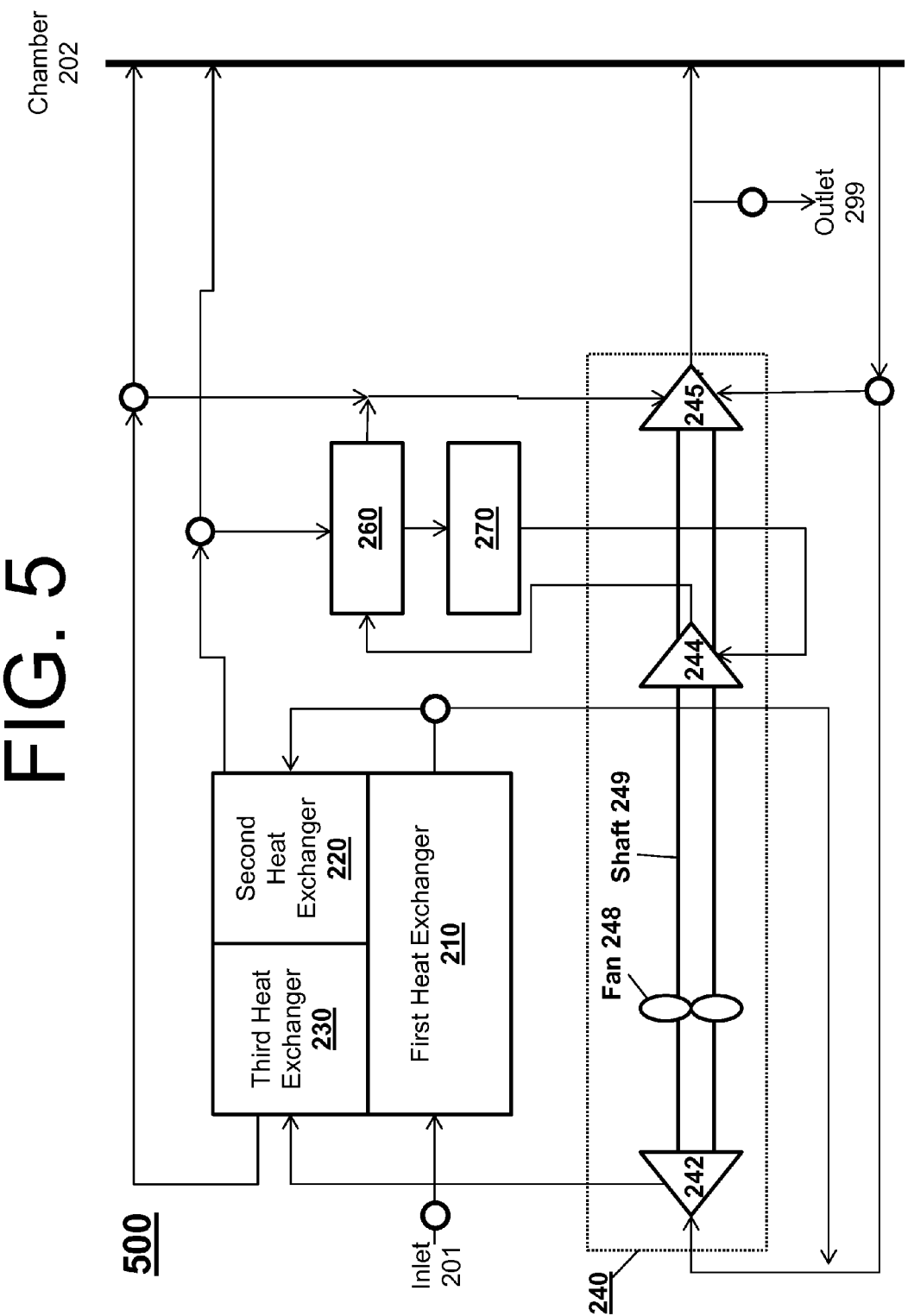
FIG. 5 depicts another schematic of a system according to an embodiment.

FIG. 5 depicts a schematic of a system 500 (e.g., an embodiment of system 100) as it could be installed on an aircraft. The system 500 illustrates bleed air flowing in at inlet 201 (e.g., off an engine of an aircraft at an initial flow rate, pressure, temperature, and humidity), which in turn is provided to a chamber 202 (e.g., cabin, flight deck, etc.) at a final flow rate, pressure, temperature, and humidity. Then the bleed air recirculates back through the system 500 from the chamber 202 based on ground or flight operations. In system 500, the bleed air is fed to the turbine 244 from the water extractor 270 so as to drive air cycle machine 240.

During ground operations of the aircraft, the bleed air in this embodiment is driving the recirculation loop (e.g., to create a shoestring cycle). For example, at the inlet 201, the bleed air is coming off the engine (e.g., at 35 psi air) and goes through the components of the system 300, such as the first and second heat exchangers 210, 220 and goes into the high pressure water separator (e.g., blocks 260, 270) and gets dehumidified. Further, the bleed air expands across the turbine 244 before being sent to the chamber 202 through the turbine 245. Next, the energy in the bleed air that is in the chamber 202 is utilized to drive a recirculation of the bleed air (i.e., recirculation air) directly. That is, the recirculation air from the chamber 202 is drawn in and compress by the compressor 242 before being passed to the third heat exchanger 230, the turbine 245, and back to the chamber 202. In this way, the energy of the bleed air is being utilized to directly drive a recirculation sub-system of the system 500 to cool the recirculation air directly.

During flight operations of the aircraft, a pressure of the bleed air at the first heat exchanger 210 can be very low, such as at cabin pressure, 12 psi, or 13 psi, as the bleed air is drawn from the lowest pressure location of the engine available to operate the system 400 (e.g., at cabin pressure, 12 psi, or 13 psi). To get the bleed air in this embodiment to the chamber 202, the energy of the recirculation air, which is the same or relatively close the pressure of the bleed air entering the first heat exchanger 210 (e.g., cabin pressure, 12 psi, or 13 psi), is utilized based on the air pressure ratio described above to provide power to the turbine 245 that supplements the power already supplied by the bleed air in turbines 242, 245.

Figure 6:
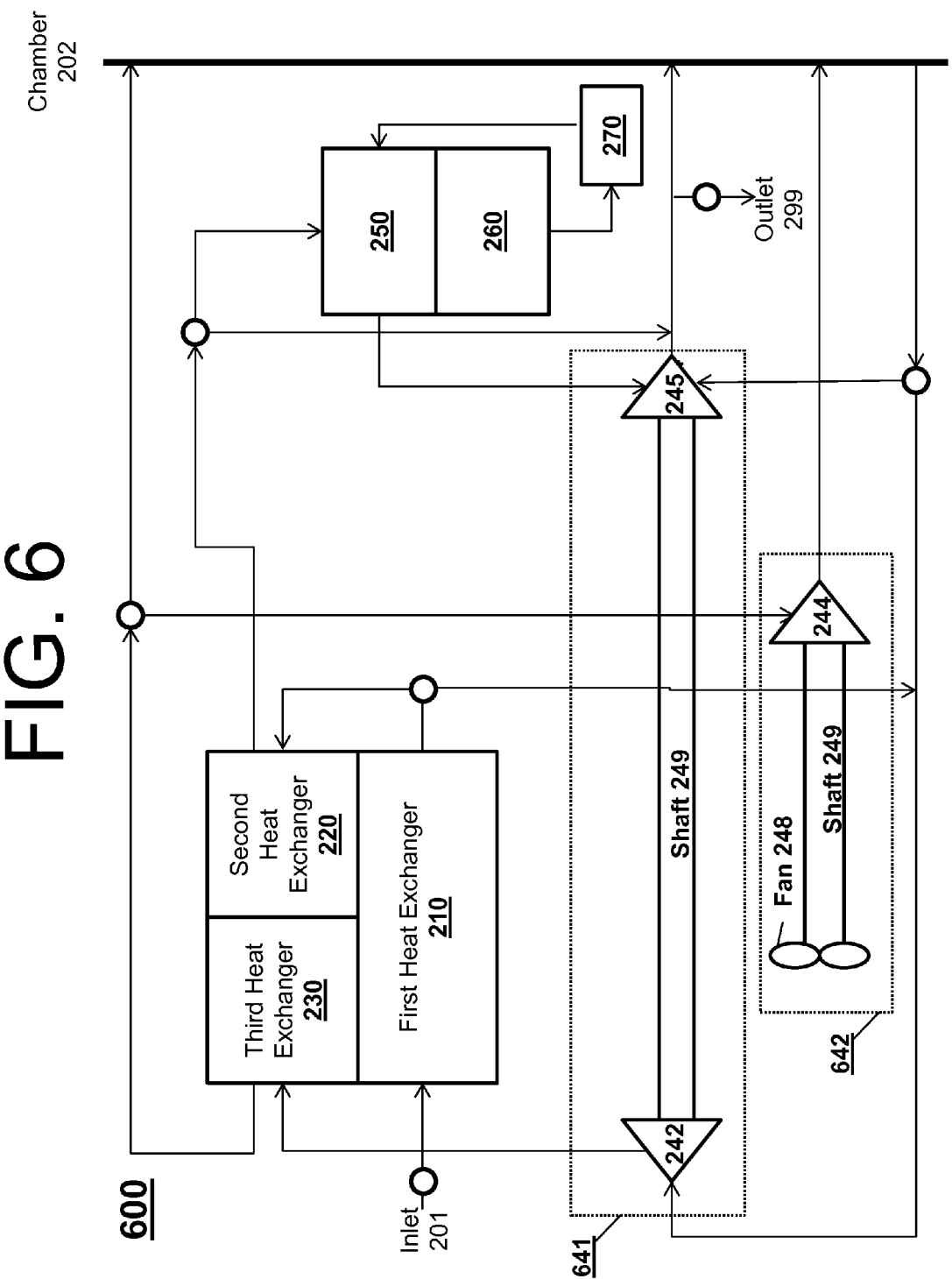
FIG. 6 depicts a schematic of a system with a dual spool according to an embodiment.

FIG. 6 depicts a schematic of a system 600 with a dual spool, i.e., spools 641, 642, which implements a shoestring cycle. During ground operations of the aircraft, the bleed air in this embodiment is driving the recirculation loop (e.g., to create a shoestring cycle). For example, the recirculation air is compressed by the compressor 242 of the spool 641 before being used to drive the turbine 244 of spool 642 directly.

During flight operations of the aircraft, a pressure of the bleed air at the first heat exchanger 210 can be very low. To get the bleed air in this embodiment to the chamber 202, the energy of the recirculation air, which is the same or relatively close the pressure of the bleed air entering the first heat exchanger 210 (e.g., cabin pressure, 12 psi, or 13 psi), is utilized based on the air pressure ratio described above to provide power to the turbine 245 of spool 641 that supplements the power already supplied by the bleed air in the turbine 245.

Figure 7:
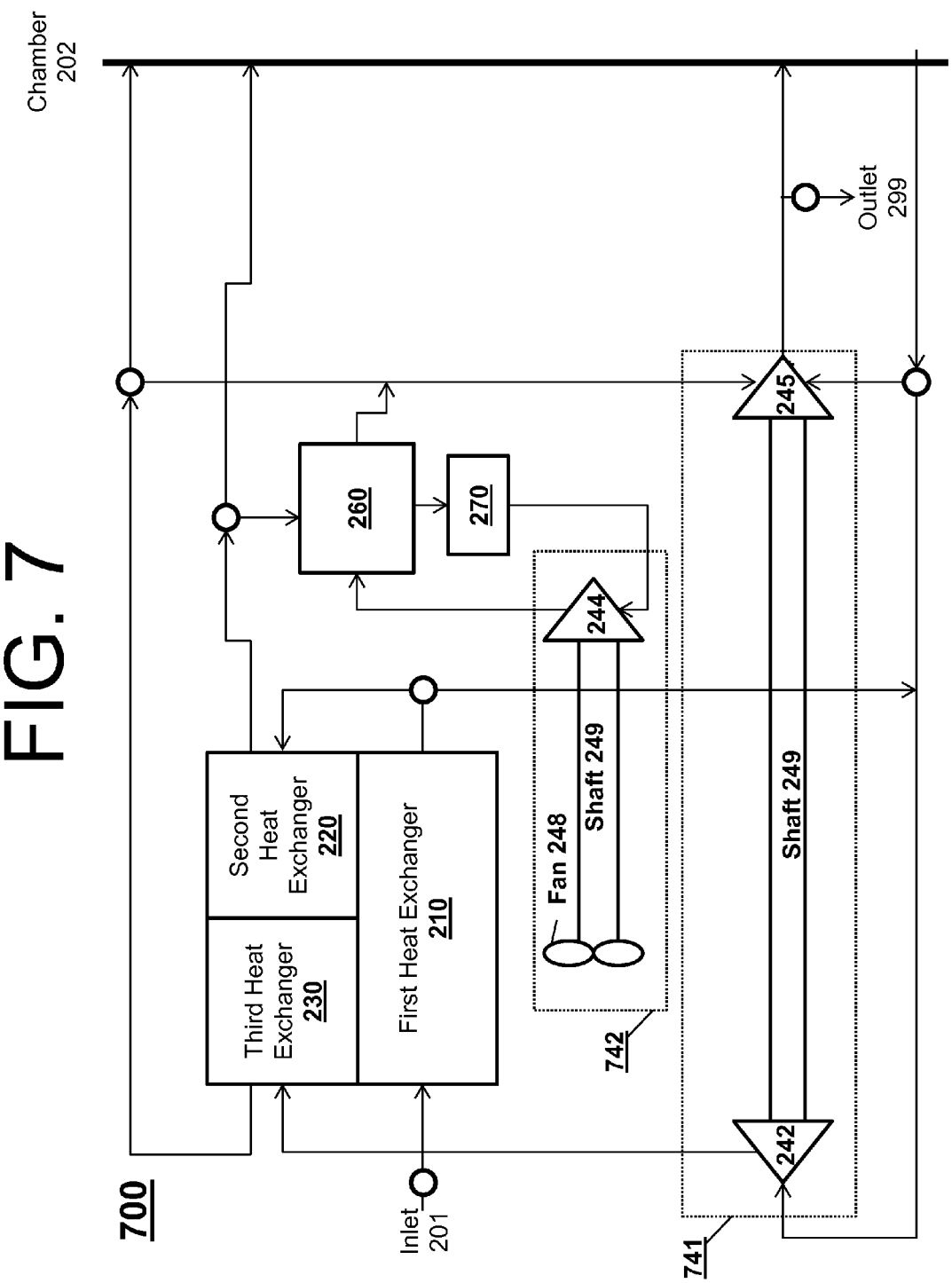
FIG. 7 depicts another schematic of a system with a dual spool according to an embodiment.

FIG. 7 depicts a schematic of a system 700 with a dual spool, i.e., spools 741, 742, which implements a shoestring cycle. During ground operations of the aircraft, the bleed air in this embodiment is driving the recirculation loop (e.g., to create a shoestring cycle). For example, the recirculation air is compressed by the compressor 242 of the spool 741 before being combined with the bleed air to drive the turbine 245 of spool 741 directly.

During flight operations of the aircraft, a pressure of the bleed air at the first heat exchanger 210 can be very low. To get the bleed air in this embodiment to the chamber 202, the energy of the recirculation air, which is the same or relatively close the pressure of the bleed air entering the first heat exchanger 210 (e.g., cabin pressure, 12 psi, or 13 psi), is utilized based on the air pressure ratio described above to provide power to the turbine 245 of spool 741 that supplements the power already supplied by the bleed air in the turbine 245 of spool 741.

The technical effects and benefits of embodiments of the present invention include employing a shoestring cycle by that uses of the lowest possible engine bleed port based on environmental conditions to maximize engine efficiency and therefore maximizes airplane efficiency In view of the above, an embodiment of the present invention that utilizes recirculation air, comprises an inlet configured to supply bleed air at a first energy from a source to the environmental control system, wherein the environmental control system supplies the bleed air at a second energy to a chamber; and an air cycle machine comprising a compressor and a turbine, wherein the air cycle machine receives the recirculation air from the chamber, wherein the recirculation air is bleed air at a third energy flowing from the chamber to the air cycle machine.

In the above environmental control system, the bleed air may drive the air cycle machine and the compressor receives the recirculation air flowing from the chamber to the air cycle machine. Further, the bleed air may expand across the turbine to drive the air cycle machine, the recirculation air received by the compressor may be compressed based on the bleed air expanding across the turbine to produce compressed recirculation air, and the environmental control system may pass the compressed recirculation air back to the chamber. Further, the environmental control system may pass the compressed recirculation air from the compressor to a second heat exchanger, from the second heat exchanger to a second turbine of the air cycle machine, and from the second turbine back to the chamber.

In the above environmental control system, a first portion of the recirculation air may drives the air cycle machine and the compressor may receive a second portion of the recirculation air.

In the above environmental control system, the first portion of the recirculation air may expand across the turbine to drive the air cycle machine, the second portion of the recirculation air received by the compressor may be compressed based on the first portion of the recirculation expanding across the turbine to produce compressed recirculation air, and the environmental control system may pass the compressed recirculation air back to the chamber. Further, the environmental control system may pass the first portion of the recirculation air to an outlet after the first portion of the recirculation air expands across the turbine. Further, the environmental control system may pass the compressed recirculation air from the compressor to a second heat exchanger, from the second heat exchanger to a second turbine of the air cycle machine, and from the second turbine back to the chamber.

In the above environmental control system, the recirculation air may drives the air cycle machine and the compressor may receive the bleed air. Further, the recirculation air may expand across the turbine to drive the air cycle machine, the bleed air received by the compressor may be compressed based on the recirculation air expanding across the turbine to produce compressed bleed air, and the environmental control system may provide the compressed bleed air to the chamber. Further, the environmental control system may pass the recirculation air to an outlet after the expanding of the recirculation air across the turbine.

In the above environmental control system, the air cycle machine may further comprise a dual spool cycle configuration that includes a turbine of a first spool configured to receive the bleed air and a compressor of a second spool configured to receive the recirculation air.

In the above environmental control system, the bleed air may be drawn from a low pressure location of the engine, wherein the first energy may be a first pressure, wherein the second energy may be a second pressure, and wherein a value of the first pressure may be the same or close to a value of the second pressure.

The above environmental control system may further be included in an aircraft and the chamber may be a cabin of the aircraft.

In view of the above, an embodiment of the present invention that provides recirculation air to an environmental control system comprises supplying via an inlet a flow of bleed air to the environmental control system at a first energy; providing the bleed air from the environmental control system at a second energy into a chamber; and providing the recirculation air to the environmental control system by recirculating the bleed air at a third energy from the chamber to an air cycle machine.

The above method may further comprise utilizing the bleed air to drive the air cycle machine and receiving by a compressor of the air cycle machine the recirculation air. Further, the method may comprise expanding the bleed air across a turbine of the air cycle machine to drive the air cycle machine; drawing in the recirculation air from the chamber based on the expanding of the bleed air across the turbine; compressing by the compressor of the air cycle machine the recirculation air to produce compressed recirculation air; and passing the compressed recirculation air back to the chamber. Further, the passing of the compressed recirculation air back to the chamber may comprise providing the compressed recirculation air from the compressor of the air cycle machine to a second heat exchanger; providing the compressed recirculation air from the second heat exchanger to a second turbine of the air cycle machine; and providing the compressed recirculation air from the second turbine to the chamber.

The above method may further comprise utilizing a first portion of the recirculation air to drive the air cycle machine; and receiving by a compressor of the air cycle machine a second portion of the recirculation air. Further, the method may comprise expanding the first portion of the recirculation air across a turbine of the air cycle machine to drive the air cycle machine; drawing in the second portion of the recirculation air from the chamber based on the expanding of the bleed air across the turbine; compressing by the compressor of the air cycle machine the second portion of the recirculation air to produce compressed recirculation air; and passing the compressed recirculation air back to the chamber. Further, the method may comprise passing the first portion of the recirculation air to an outlet after the expanding of the first portion of the recirculation air across the turbine. The passing of the compressed recirculation air back to the chamber may further comprise providing the compressed recirculation air from the compressor of the air cycle machine to a second heat exchanger; providing the compressed recirculation air from the second heat exchanger to a second turbine of the air cycle machine; and providing the compressed recirculation air from the second turbine to the chamber.

The above method may further comprise utilizing the recirculation air to drive the air cycle machine; and receiving by a compressor of the air cycle machine the bleed air. Further, the method may comprise expanding the recirculation air across a turbine of the air cycle machine to drive the air cycle machine; compressing by the compressor of the air cycle machine the bleed air based on the expanding of the recirculation air across the turbine to produce compressed bleed air; and providing the compressed bleed air to the chamber. Further, the method may comprise passing the recirculation air to an outlet after the expanding of the recirculation air across the turbine.

With respect to the above method, the air cycle machine may further comprise a dual spool cycle configuration, such that the method comprises receiving the bleed air by a turbine of a first spool of the air cycle machine; and receiving the recirculation air by a compressor of a second spool of the air cycle machine.

In the above method, the bleed air may be drawn from a low pressure location of a source, the first energy may be a first pressure, the second energy may be a second pressure, and a value of the first pressure may be the same or close to a value of the second pressure.

In the above method, the environmental control system may be included in an aircraft and the chamber may be a cabin of the aircraft.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing recirculation air to an environmental control system, comprising:
   supplying via an inlet a flow of bleed air to the environmental control system at a first energy;
   providing the bleed air from the environmental control system at a second energy into a chamber;
   providing the recirculation air to the environmental control system by recirculating the bleed air at a third energy from the chamber to an air cycle machine;
   during a ground operation of the aircraft, utilizing the bleed air to drive the air cycle machine and receiving by a compressor of the air cycle machine the recirculation air;
   during a first flight operation of the aircraft, utilizing a first portion of the recirculation air to drive the air cycle machine and receiving by the compressor of the air cycle machine a second portion of the recirculation air; and
   during a second flight operation of the aircraft, utilizing the recirculation air to drive the air cycle machine and receiving by a compressor of the air cycle machine the bleed air.

2. The method of claim 1, further comprises:
   expanding the bleed air across a turbine of the air cycle machine to drive the air cycle machine;
   drawing in the recirculation air from the chamber based on the expanding of the bleed air across the turbine;
   compressing by the compressor of the air cycle machine the recirculation air to produce compressed recirculation air; and
   passing the compressed recirculation air back to the chamber.

3. The method of claim 2, wherein the passing of the compressed recirculation air back to the chamber further comprises:
   providing the compressed recirculation air from the compressor of the air cycle machine to a second heat exchanger;
   providing the compressed recirculation air from the second heat exchanger to a second turbine of the air cycle machine; and
   providing the compressed recirculation air from the second turbine to the chamber.

4. The method of claim 1, further comprises:
   expanding the first portion of the recirculation air across a turbine of the air cycle machine to drive the air cycle machine;
   drawing in the second portion of the recirculation air from the chamber based on the expanding of the bleed air across the turbine;
   compressing by the compressor of the air cycle machine the second portion of the recirculation air to produce compressed recirculation air; and
   passing the compressed recirculation air back to the chamber.

5. The method of claim 4, further comprises:
   passing the first portion of the recirculation air to an outlet after the expanding of the first portion of the recirculation air across the turbine.

6. The method of claim 4, wherein the passing of the compressed recirculation air back to the chamber further comprises:
   providing the compressed recirculation air from the compressor of the air cycle machine to a second heat exchanger;
   providing the compressed recirculation air from the second heat exchanger to a second turbine of the air cycle machine; and
   providing the compressed recirculation air from the second turbine to the chamber.

7. The method of claim 1, further comprises:
   expanding the recirculation air across a turbine of the air cycle machine to drive the air cycle machine;
   compressing by the compressor of the air cycle machine the bleed air based on the expanding of the recirculation air across the turbine to produce compressed bleed air; and
   providing the compressed bleed air to the chamber.

8. The method of claim 7, further comprises:
   passing the recirculation air to an outlet after the expanding of the recirculation air across the turbine.

9. The method of claim 1, wherein the air cycle machine further comprises a dual spool cycle configuration, and the method further comprises:
   receiving the bleed air by a turbine of a first spool of the air cycle machine; and
   receiving the recirculation air by a compressor of a second spool of the air cycle machine.

10. The method of claim 1, wherein the bleed air is drawn from a low pressure location of a source,
    wherein the first energy is a first pressure,
    wherein the second energy is a second pressure, and
    wherein a value of the first pressure is the same or close to a value of the second pressure.

11. The method of claim 1, wherein the chamber is a cabin of the aircraft.

* * * * *